US 8,065,238 B2

(12) United States Patent
Bell

(10) Patent No.: US 8,065,238 B2
(45) Date of Patent: Nov. 22, 2011

(54) PERFORMING ROBUST COST ANALYSIS OF A GAS LASER APPLICATION

(75) Inventor: David W. Bell, Alpharetta, GA (US)

(73) Assignee: Lincoln Global, Inc., Monterey Park, CA (US)

( * ) Notice: Subject to any disclaimer, the term of this patent is extended or adjusted under 35 U.S.C. 154(b) by 1250 days.

(21) Appl. No.: 11/292,894

(22) Filed: Dec. 2, 2005

(65) Prior Publication Data

US 2007/0127537 A1 Jun. 7, 2007

(51) Int. Cl.
*G06Q 99/00* (2006.01)
(52) U.S. Cl. ......... 705/400; 705/7.29; 705/7.35; 372/55
(58) Field of Classification Search .................. 700/100, 700/102, 36, 99, 29, 28, 27, 9, 8, 7, 97, 95; 705/400, 29, 28, 27, 7, 1.1, 8, 402, 7.29, 705/7.35; 219/121.6, 121.61, 121.71, 121.72, 219/121.84, 121.67; 606/13, 2; 228/119; 60/772, 595; 702/136, 181; 372/58–59, 372/98, 55
See application file for complete search history.

(56) References Cited

U.S. PATENT DOCUMENTS

| 5,216,593 | A | * | 6/1993 | Dietrich et al. ............... 345/467 |
| 5,260,961 | A | * | 11/1993 | Zhou et al. ...................... 372/57 |
| 5,479,704 | A | * | 1/1996 | Richter et al. ............... 29/889.1 |
| 5,770,833 | A | * | 6/1998 | Kanaoka et al. ......... 219/121.67 |
| 5,832,069 | A | | 11/1998 | Waters et al. |
| 5,918,219 | A | | 6/1999 | Isherwood |
| 6,157,900 | A | | 12/2000 | Maseeh |
| 6,470,233 | B1 | * | 10/2002 | Johnson, Jr. .................. 700/237 |
| 6,482,199 | B1 | * | 11/2002 | Neev ............................... 606/10 |
| 6,603,794 | B2 | * | 8/2003 | Bethel et al. .................... 372/98 |
| 6,612,382 | B2 | | 9/2003 | King |
| 6,775,647 | B1 | * | 8/2004 | Evans et al. ....................... 703/7 |
| 6,777,641 | B2 | * | 8/2004 | Cole et al. ................ 219/121.67 |
| 6,801,731 | B2 | | 10/2004 | Parker |
| 6,804,574 | B2 | * | 10/2004 | Liu et al. ......................... 700/166 |
| 6,804,612 | B2 | * | 10/2004 | Chow et al. ..................... 702/34 |
| 7,398,254 | B2 | * | 7/2008 | Ueda et al. .................... 705/400 |
| 2001/0049618 | A1 | * | 12/2001 | Patzel et al. ....................... 705/8 |
| 2002/0057724 | A1 | * | 5/2002 | Vogler et al. .................... 372/58 |

(Continued)

FOREIGN PATENT DOCUMENTS

JP 361123495 A * 11/1986

OTHER PUBLICATIONS

Rich, Ronald R., "Laser Gas Analysis- Removing the Guesswork from Furnace Atmosphere Control", Sep. 2002, Heat Treating Process, 4 pages.*

(Continued)

*Primary Examiner* — John Hayes
*Assistant Examiner* — Freda A Nelson
(74) *Attorney, Agent, or Firm* — Turocy & Watson, LLP

(57) ABSTRACT

A system that performs an analysis of a gas laser application comprises a receiver component that receives an identity of a gas laser and parameters relating to intended use of the gas laser. An analysis component automatically generates a cost analysis of the gas laser application based at least in part upon the received identity and parameters, the cost analysis includes fixed cost and variable cost of the gas laser application.

15 Claims, 15 Drawing Sheets

U.S. PATENT DOCUMENTS

| | | | |
|---|---|---|---|
| 2002/0143418 A1* | 10/2002 | Ohara et al. | 700/95 |
| 2004/0060960 A1* | 4/2004 | Becker et al. | 228/37 |
| 2004/0152391 A1* | 8/2004 | Fushimi et al. | 445/24 |
| 2004/0230541 A1 | 11/2004 | Lefton et al. | |
| 2005/0192963 A1 | 9/2005 | Tschiegg et al. | |

OTHER PUBLICATIONS

"Laser Diodes, New Sensitized Products Mate to Provide Cost, Speed Benefits", Oct 17, 1985, PR Newswire, 3 pgs.*

"Premier Laser launches new products and pricing Strategy", Dec. 1, 1998, Biotech Equipment update, 5 pages.*

Cook, David; "Cost of Operation in Mechanized Plasma Cutting", May 2000, Welding Design & Fabrication,—May 2000.*

Homan, Roy, "Laser Cutting? Make it Microbulk", Apr. 1, 2004; Welding Magazine, 4 pages.*

"Premier Laser launches New Products and Pricing Strategy", Dec. 1, 1998, Biotech Equipment update, 5 pages.*

* cited by examiner

| Cust Info | Laser Info | Cutting Info | Assist Gas | Order Form | Gas Cost 1 | Gas Cost 2 |

| Quantity | Item Number | Description | Unit Price | Total Price |
|---|---|---|---|---|
| | | Equipment for Component Laser Gases (He, N2, CO2) | | |
| 1 | None | None | $ 0.00 | $0.00 |
| 1 | None | None | $ 0.00 | $0.00 |
| 1 | None | None | $ 0.00 | $0.00 |
| | | Equipment for 3 Component Premix Laser Gases (He, N2, CO2) | | |
| 1 | None | None | $ 0.00 | $0.00 |
| | | Equipment for 4 Component Premix Laser Gases (He, N2, CO2, CO) | | |
| 1 | None | None | $ 0.00 | $0.00 |
| | Gas Purifier System Selection | | | |
| 1 | None | None | $ 0.00 | $0.00 |
| | | | Total Equipment | $0.00 |

Save · Print · Close · Back · Next

Figure 13:
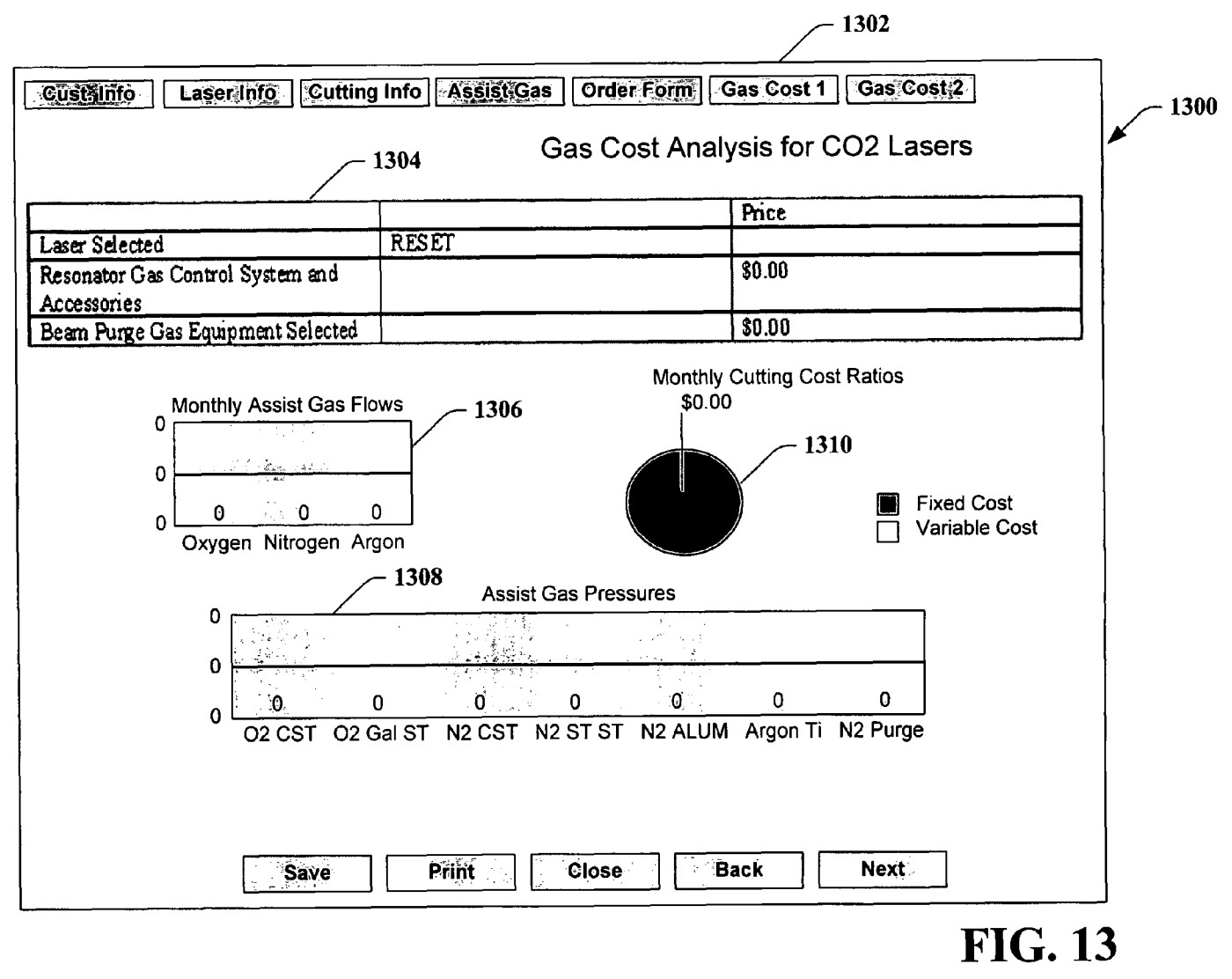

Gas Cost Analysis for CO2 Lasers

Tabs: Cust Info | Laser Info | Cutting Info | Assist Gas | Order Form | Gas Cost 1 | Gas Cost 2

| | Price |
|---|---|
| Laser Selected | RESET |
| Resonator Gas Control System and Accessories | $0.00 |
| Beam Purge Gas Equipment Selected | $0.00 |

Monthly Assist Gas Flows (1306)
- Oxygen: 0
- Nitrogen: 0
- Argon: 0

Monthly Cutting Cost Ratios (1310): $0.00
- ■ Fixed Cost
- □ Variable Cost

Assist Gas Pressures (1308)
- O2 CST: 0
- O2 Gal ST: 0
- N2 CST: 0
- N2 ST ST: 0
- N2 ALUM: 0
- Argon Ti: 0
- N2 Purge: 0

Buttons: Save | Print | Close | Back | Next

PERFORMING ROBUST COST ANALYSIS OF A GAS LASER APPLICATION

TECHNICAL FIELD

The subject invention relates generally to material processing, and more particularly to laser material processing by way of gas-powered lasers.

BACKGROUND

Complex laser systems are employed in nearly every field of manufacturing, from clothing manufacturing to creation of knives to manufacture of automobiles. Laser systems can also be utilized for other applications as well, including (but not limited to) interferometry, holography, spectroscopy, bar code scanning, optical demonstrations, retinal phototherapy, lithography, measurement of air pollution, weaponry, material processing (cutting and welding), surgery, engraving, etc. In a medical example, lasers can be utilized for creating precise incisions as well as to enable more expedient healing when compared to incisions created by way of scalpel. Gas lasers are one general type of laser that is suitable for the above exemplary applications, wherein such lasers operate by way of discharge of an electric current through a gas to produce light. Types of these lasers include helium-neon lasers, argon ion lasers, krypton ion lasers, xenon ion lasers, nitrogen lasers, carbon dioxide lasers, carbon monoxide lasers, and various other gas lasers.

Advancements in laser technologies have correlated with improved manufactured products, improved medical treatment, as well as various other improvements that most take for granted. For instance, smooth flowing lines on today's automobiles are accomplished based at least in part upon cuts made to sheet metal through employment of gas lasers. Likewise, parts in rotating machinery that have been manufactured through gas lasers are more durable when compared to machinery made through more archaic cutting means, such as presses and saws. In essence, any piece of material that can be cut can typically be cut more quickly and accurately through employment of gas lasers when compared to other suitable cutting mechanisms.

As mentioned above, carbon dioxide lasers are one exemplary gas laser, and such lasers are quite prevalent and highly useful. In more detail, carbon dioxide lasers are the highest power continuous wave lasers that are currently available to those in an industry where cutting of metals is undertaken. Carbon dioxide lasers utilize various gases (including carbon dioxide) to produce an infrared beam, and such beam is in turn employed in connection with materials processing (e.g., cutting and refining metals). In typical carbon dioxide lasers, a principal wavelength of the infrared beam lies somewhere between 9.4 and 10.6 micrometers. The exact principal wavelength can depend upon a cutting application (e.g., cutting aluminum of a particular thickness, cutting sheet metal of certain thickness, and the like).

Utilizing these gas laser mechanisms, particularly in a manufacturing context, often requires a significant amount of planning prior to undertaking a manufacturing application that utilizes these lasers. For instance, gases employed by gas lasers are associated with cost, which can vary depending upon time of year and location of a distributor. Similarly, disparate gases and pressures may need to be employed for different applications (e.g., cutting of different metals, different thicknesses of material, . . . ). Accordingly, valuable time and resources may be lost in simply determining whether or not to undertake a manufacturing application that employs gas laser technologies.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates generally to analyzing costs associated with gas laser applications. Gas lasers have permeated into many parts of industry, and have become an important tool, for example, in connection with fabrication of metal products. Gas laser applications, however, can be expensive due to cost of purchasing laser equipment, costs of gas, and the like. Accordingly, potential implementers of gas laser applications may wish to undertake a robust analysis of such process, wherein such analysis is desirably undertaken in an expedient manner. Described herein are mechanisms and methods for enabling such an expedient cost analysis of a gas laser application. In particular, given an identity of a gas laser (e.g., a carbon dioxide laser) and parameters associated therewith, a cost analysis of a gas laser application can be provided to a user in an intuitive and logical manner. The parameters can include gases to be employed by the gas laser, equipment (such as gas cylinders) that will be utilized, assist gas information, duration of the gas laser application (e.g., two years, three years, . . . ), an amount of time the gas laser will be operating, type of material to be cut by the gas laser, thickness of the gas laser, etc. In one example, a database can be provided that includes a plurality of gas lasers and costs associated therewith. This database can include references between the gas lasers and materials cut by such lasers, prices of such lasers, gases associated with such lasers, and the like.

In still more detail, one or more graphical user interfaces can be employed in connection with receiving information from a user relating to the gas laser application and outputting a cost analysis given such information. For instance, a graphical user interface can include a list of selectable gas lasers, wherein selection of one of such gas lasers enables provision of additional data and/or questions to the user. For instance, upon selection of the gas laser, price associated with such gas laser can be automatically provided upon selection thereof. Furthermore, gases and/or gas-based equipment (e.g., gas identification, materials, . . . ) can be automatically displayed to the user upon selection of the gas laser. Additionally, given thickness of materials, gas laser identity, and other suitable information, an amount of assist gas that will be employed in effectuating the gas laser application can be automatically determined. The aforementioned database can further include price information related to gases—therefore, if an estimate of an amount of gas needed to enable the gas laser application is determined, an estimate of the cost of such gas can also be generated.

A robust analysis can be provided to the user upon receipt of the identity of the gas laser and parameters associated therewith, wherein such analysis can include fixed costs as well as variable costs. Fixed costs can include price of equipment, which may comprise both purchase price and rental price of such equipment. Variable costs can include price of gas over certain periods of time. Further, cost of a gas laser application can be determined on a per hour basis, thereby allowing an implementer of the application to quickly determine if it is cost-effective to effectuate the gas laser application. Other time ranges (e.g., cost per day, cost per week, . . . ) can also be provided to the user.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

BRIEF DESCRIPTION OF THE DRAWINGS

FIG. 8 is a screenshot of an exemplary graphical user interface that can be employed in connection with soliciting gas laser data from a user.

FIG. 11 is a screenshot of an exemplary graphical user interface that displays an order form associated with gas laser equipment.

FIG. 12 is a screenshot of an exemplary graphical user interface that displays cost information associated with gases utilized in the gas laser application.

FIG. 13 is a screenshot of an exemplary graphical user interface that displays graphical depictions of cost associated with the gas laser application.

DETAILED DESCRIPTION

Figure 1:
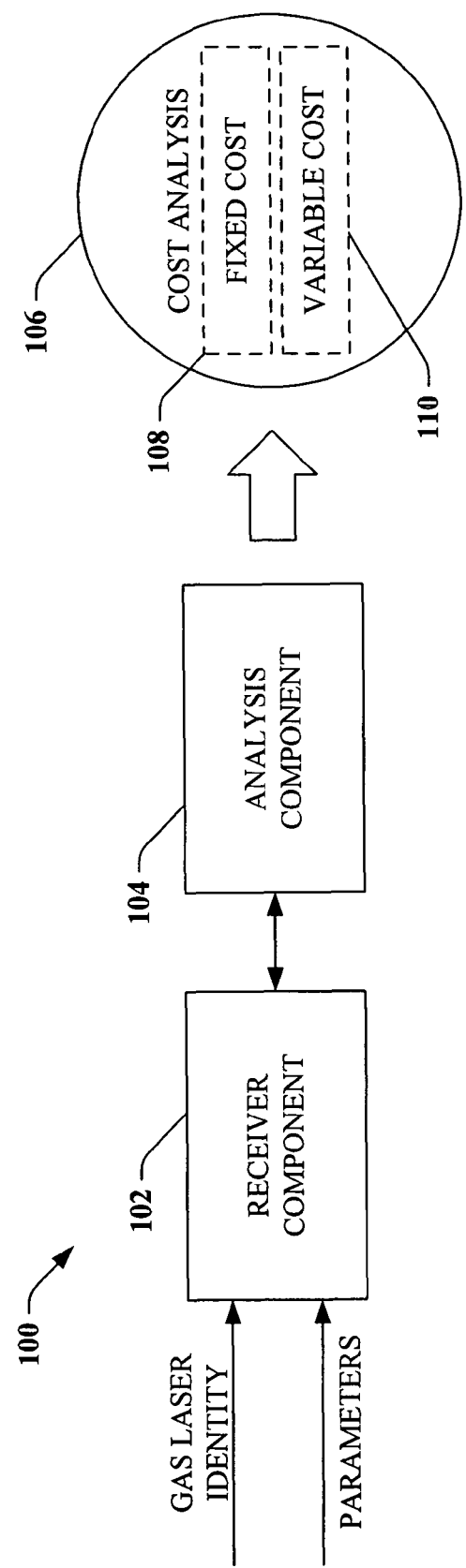
FIG. 1 is a high-level block diagram of a system that facilitates performing a robust cost analysis of a gas laser application.

The subject invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

A "laser" or "gas laser" refers to physical hardware for cutting material and/or producing a weld, wherein the hardware can include a wire feeder, contact tip, dresser, gas mixer, gas sneezer, gas controller, clamp actuator, travel carriage/part manipulator, robot arm/beam/torch manipulator, laser seam tracker, other input/output devices and source along with any controller(s), monitor(s), and communications interface(s) associated with the physical hardware. "Laser process" refers to an act or acts involved in a cutting or joining process and can include consumables to be used in the process along with settings for various aspects of a laser system before, during, and/or after a cutting or joining process.

Referring now to the drawings, FIG. 1 illustrates a system 100 that facilitates performing a high-level analysis of a gas laser application. For example, a gas laser application can relate to manufacturing a particular part, performing a certain cut, cutting a particular material or materials, cutting materials of a specific thickness, etc. The system 100 includes a receiver component 102 that receives an identity of a gas laser to be employed within the gas laser application. Today there exists a myriad of different gas lasers, including carbon dioxide lasers, wherein certain gas lasers may be associated with particular applications. The identity of the gas laser can be provided by a user through a graphical user interface, voice recognition technology, or any other suitable manner that enables a user to identity a laser to be employed in connection with the gas laser application. In a particular example, a pull-down menu can be provided, wherein available gas lasers can be listed in alphabetical order or logically arranged in another manner that can be intuitively traversed by a user.

The receiver component 102 can also receive parameters relating to the gas laser application (which is intended to be undertaken upon completion of the analysis). For example, the parameters can be automatically gleaned based at least in part upon the received gas laser identity. In more detail, the identified gas laser can be associated with particular gases, particular gas cylinders and/or other equipment, certain gas pressure or gas flow ranges, and the like. These parameters can be retrieved from a database (not shown) upon the receiver component 102 receiving the identity of the gas laser. In another example, a user can provide parameters to the receiver component 102 through one or more graphical user interfaces. For instance, upon receipt of the gas laser identity, a graphical user interface can be provided to the user that includes selectable fields associated with type of material to be cut, thickness of material to be cut, and the like. Still further, the receiver component 102 can receive information relating to assist gases that are to be employed in connection with the identified gas laser. The parameters can also include type and amount of purge gas to be employed in connection with the gas laser application, length of contract for renting equipment, mode of supplying assist gas, equipment utilized in connection with assist gas, and any other suitable parameters.

The system 100 can further include an analysis component 104 that is communicatively coupled to the receiver component 102, wherein the analysis component 104 can be provided the gas laser identity and the parameters relating to the gas laser application (that will employ the identified gas laser). Given this information, an automatic determination can be made by the analysis component 104 regarding type of gas to be employed as well as power necessary to effectuate cutting and gas pressure required to effectuate cutting. Moreover, the analysis component 104 can have access to a price list that includes prices for gases with respect to one or more geographic regions and equipment costs (including purchasing costs and rental costs). Pursuant to an example, gas prices associated with a first region may be drastically different than gas prices associated with a second region. The analysis component 104 can have access to the price list and can automatically generate a detailed cost analysis 106 based at least in part upon content of the price list, the received identity of the gas laser, and the received parameters. The cost analysis 106 can include fixed cost 108, which can comprise equipment and rental costs, as well as variable cost 110, which can include costs associated with purchase of gas and/or man-hours.

To create the cost analysis 106, the analysis component 104 can receive the gas laser identity and parameters associated therewith (described above) and can estimate consumption of one or more gases over a threshold period of time (e.g., week, month, quarter, year, . . . ). Based upon this estimated consumption, an approximated cost of gas to be used within the gas laser application over the threshold period of time can be determined. The approximated cost can then be provided to a user (in textual or graphical form) to indicate variable costs associated with the gas laser application. The analysis component 104 can further cause equipment costs and rental costs to be provided to the user to indicate fixed costs associated with the gas laser application. Thus, the system 100 can be employed in connection with undertaking a robust cost-based analysis of a gas laser application prior to implementing such application in a manufacturing environment (or other suitable environment).

Figure 2:
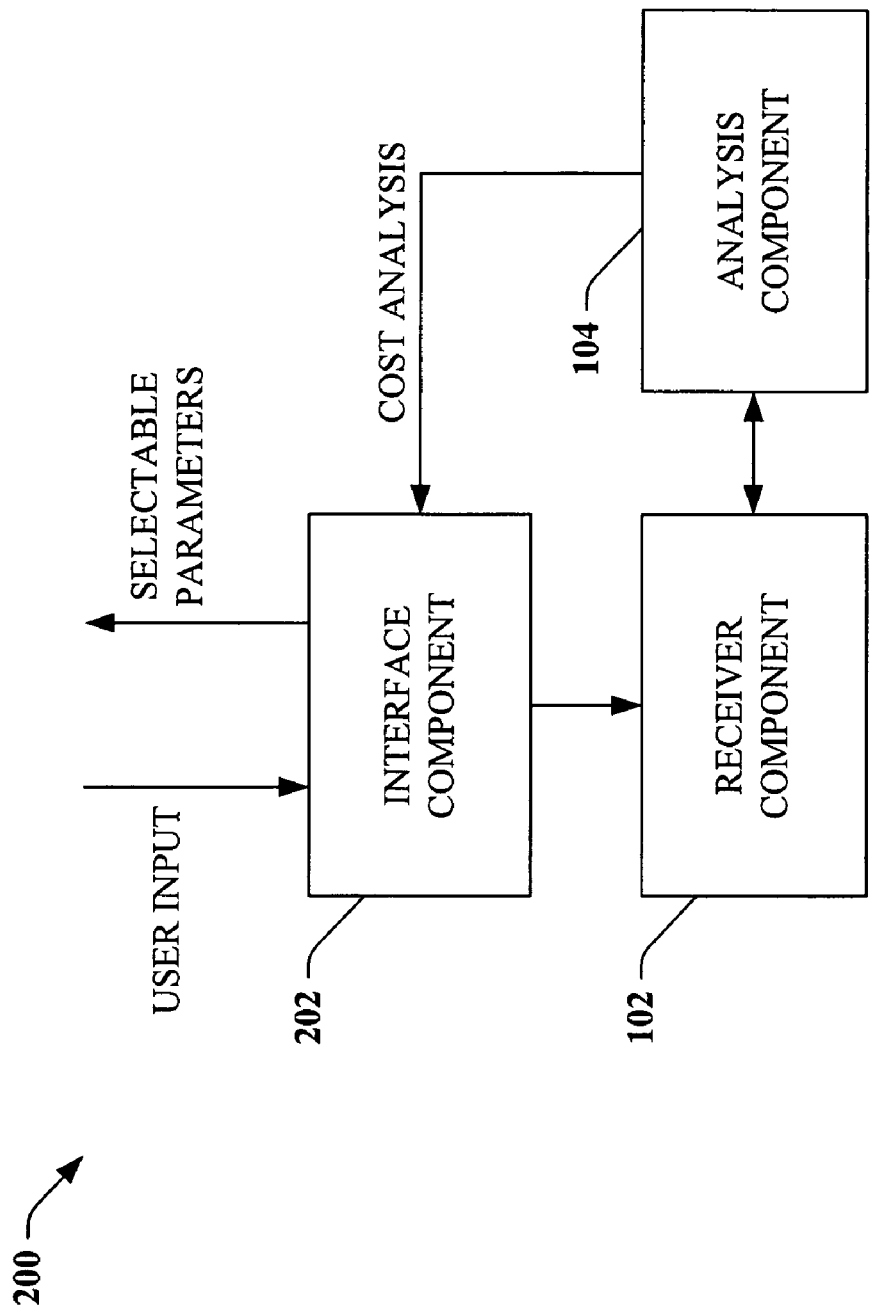
FIG. 2 is a block diagram of a system that facilitates retrieving information relating to a gas laser application from a user through a graphical user interface.

Turning now to FIG. 2, a system 200 that facilitates performance of an analysis with respect to a gas laser application is illustrated. The system 200 includes an interface component 202 that is employed to provide a graphical user interface to a user in order to solicit information relating to a gas laser application. The interface component 202 can provide a selectable list of carbon dioxide lasers (or other gas lasers) that may be desirably employed by a user. Contents of the list may vary depending upon user, time of year, or other contextual information. The user can select one or more carbon dioxide lasers from the list of lasers, which then causes the interface component 202 to provide a user with selectable parameters relating to the identified laser. For example, the interface component 202 can be communicatively coupled to a database (not shown) that includes a list of lasers. A selected laser can then be employed as an index key within the database, causing return of possible parameters that may be associated with the identified gas laser. These parameters (such as possible gases, assist gasses, equipment, modes of supply, . . . ) can be provided in a selectable manner to the user, who can then select one or more of such parameters through editable fields, radio buttons, pull-down menus, voice commands, or other suitable mechanisms/methods. Selection of non-identical gas lasers can result in provision of different parameters to the user by way of the interface component 202.

The receiver component 102 can receive user input immediately upon obtainment thereof by the interface component 202. The receiver component 102 can then relay this information to the analysis component 104, which can begin performing calculations relating to a cost analysis as information is received. In another example, the interface component 202 can retain data until sufficient information is received to enable the analysis component 104 to perform a robust cost analysis of the laser gas application.

The analysis component 104 can generate a cost analysis based upon the received user input (gas laser identity and parameters associated therewith). As described above, the analysis component 104 can estimate gas consumption, assist gas consumption, and the like. Furthermore, the analysis component 104 can access a price list to determine approximate costs associated with the gas laser application. The costs determined by the analysis component 104 can relate to equipment costs (for purchase and/or rental), cost of gas over a particular period of time, price per hour for the gas laser application, etc. Thus, the analysis component 104 can generate a robust cost analysis with respect to a gas laser application. The cost analysis can be provided to the interface component 202, which can then display at least portions of such analysis to the user. For instance, the interface component 202 can provide a graphical user interface depicting fixed costs and variable costs in a graphical manner. Further, the interface component 202 can display equipment and costs in tabular form, gas costs in tabular form, etc. Therefore, it can be discerned that the cost analysis can be provided to the user through the interface component 202 in any logically arranged manner.

Figure 3:
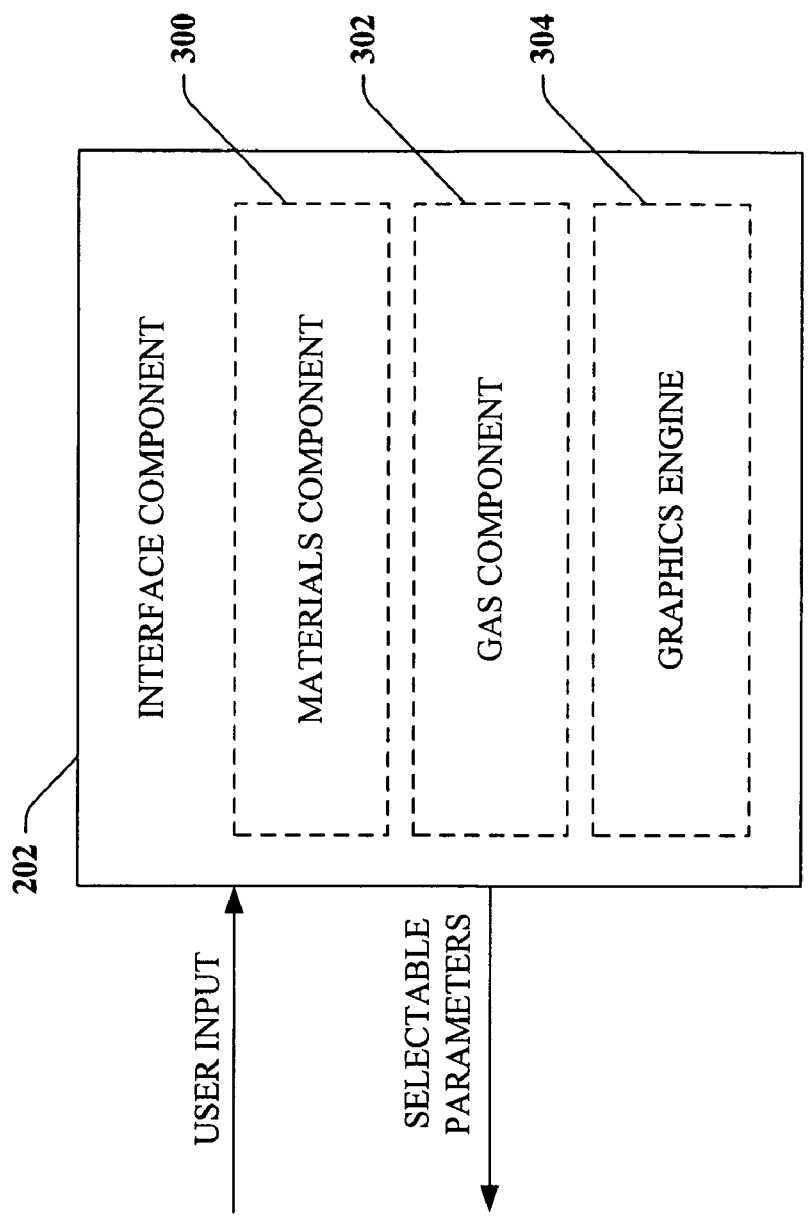
FIG. 3 is a block diagram of a component that facilitates calculation/presentation of parameters associated with a gas laser application.

Referring now to FIG. 3, the interface component 202 is illustrated in greater detail. As described above, the interface component 202 can receive user input relating to identity of a gas laser and thereafter provide selectable parameters to the user based at least in part upon the selected gas laser. A user can then provide input relating to such parameters (through pull-down menus, editable fields, radio buttons, voice commands, etc.). In more detail, the user interface component 202 can include a materials component 300 that provides a user with one or more materials that can be cut by the selected gas laser. For instance, a particular gas laser may be utilized to cut sheet metal and aluminum but not titanium doped with argon. The materials component 300, based upon the received identity of the gas laser, can prompt a user for input relating to particular materials that may be cut by the selected gas laser. The interface component 202 can further include a gas component 302 that provides a user with a selectable list of supply modes that are associated with gases that can be employed in connection with the selected gas laser and/or the gas laser application. Further, the gas component 302 can provide the user with a selectable list of equipment that is associated with mode of supply of particular gases, such as gas cylinders. Once the supply modes and/or equipment is provided to the interface component 202 by the user, the interface component 202 can relay such information to the receiver component 102 (FIGS. 1 and 2) and the analysis component 104. The analysis component 104 can then complete a cost analysis associated with a laser gas application based at least in part upon such data (the selected materials, the selected supply modes, and the selected equipment). The interface component 202 also can include a graphics engine 304 that provides a graphical depiction of the cost analysis to the user upon the analysis component 104 generating such cost analysis. For instance, the graphics engine 304 can utilize a template and populate such template based at least in part upon content of the cost analysis. In another example, the graphics engine 304 can create a graphical user interface de novo for each received cost analysis. The graphical depiction generated by way of the graphics engine 304 can include a graphical depiction of at least assist gas cost, variable cost versus fixed cost, assist gas flow, and assist gas pressures. Moreover, the interface component 202 can provide a high-level summary of the cost analysis by way of the graphics engine 304, wherein such summary includes cost of equipment utilized in the gas laser application.

Figure 4:
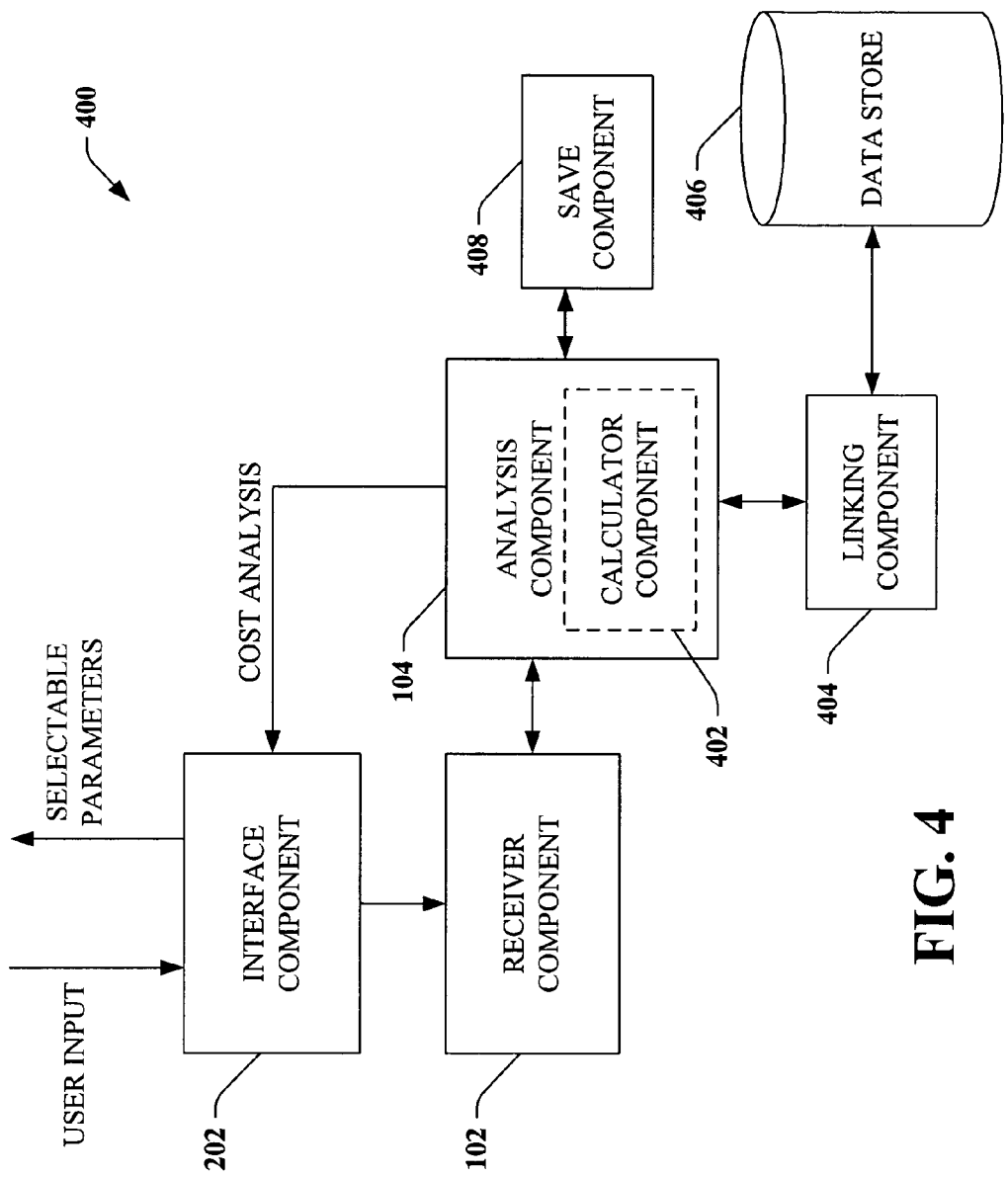
FIG. 4 is a block diagram of a system that facilitates performing a robust cost analysis of a gas laser application.

Now referring to FIG. 4, a system 400 that facilitates performing a cost analysis associated with a gas laser application is illustrated. The system 400 includes the interface component 202 that solicits user input relating to identity of a gas laser and parameters relating to the identified gas laser (e.g., materials to be cut by the gas laser, thickness of the materials, supply modes associated with gas, gas cylinders to be employed, . . . ). The interface component 202 can relay such information to the receiver component 102, which can in turn provide the information to the analysis component 104. The analysis component 104 can include a calculator component 402 that computes an estimated consumption of one or more gases associated with a gas laser identified via the interface component 202. In more detail, the interface component 202 can receive an identity of a gas laser and can provide a user with a selectable list of materials that can be cut by the gas laser. The calculator component 402 can compute an estimated gas consumption based at least in part upon the one or more materials selected by the user.

To aid the interface component 202 in provision of parameters to a user, a linking component 404 can be employed to link gas lasers with gases and/or materials that are typically associated therewith. In more detail, the linking component 404 can be associated with a data store 406 that includes a list of gas lasers, materials that can be associated with the gas lasers, gases that are associated with the gas lasers, and other information related to gas lasers. Upon receiving an indication of a selected gas laser, the linking component 404 can extract materials, equipment, and/or gases associated therewith from the data store 406. These parameters can then be provided to the analysis component 104 and/or to the interface component 202.

As described in more detail above, the analysis component 104 can generate a robust cost analysis associated with a gas laser application. This analysis can be utilized in connection with sale of a gas laser and/or application associated therewith and/or to analyze a current application. For instance, a user can determine that their current application is inefficient compared to a gas laser application by analyzing the cost analysis (which can break down costs to cost per suitable unit of time). The system 400 can further include a save component 408 that enables a cost analysis to be saved for viewing at a later time. Saving a cost analysis by way of the save component 408 may be desirable to simultaneously analyze two disparate gas laser applications.

Figure 5:
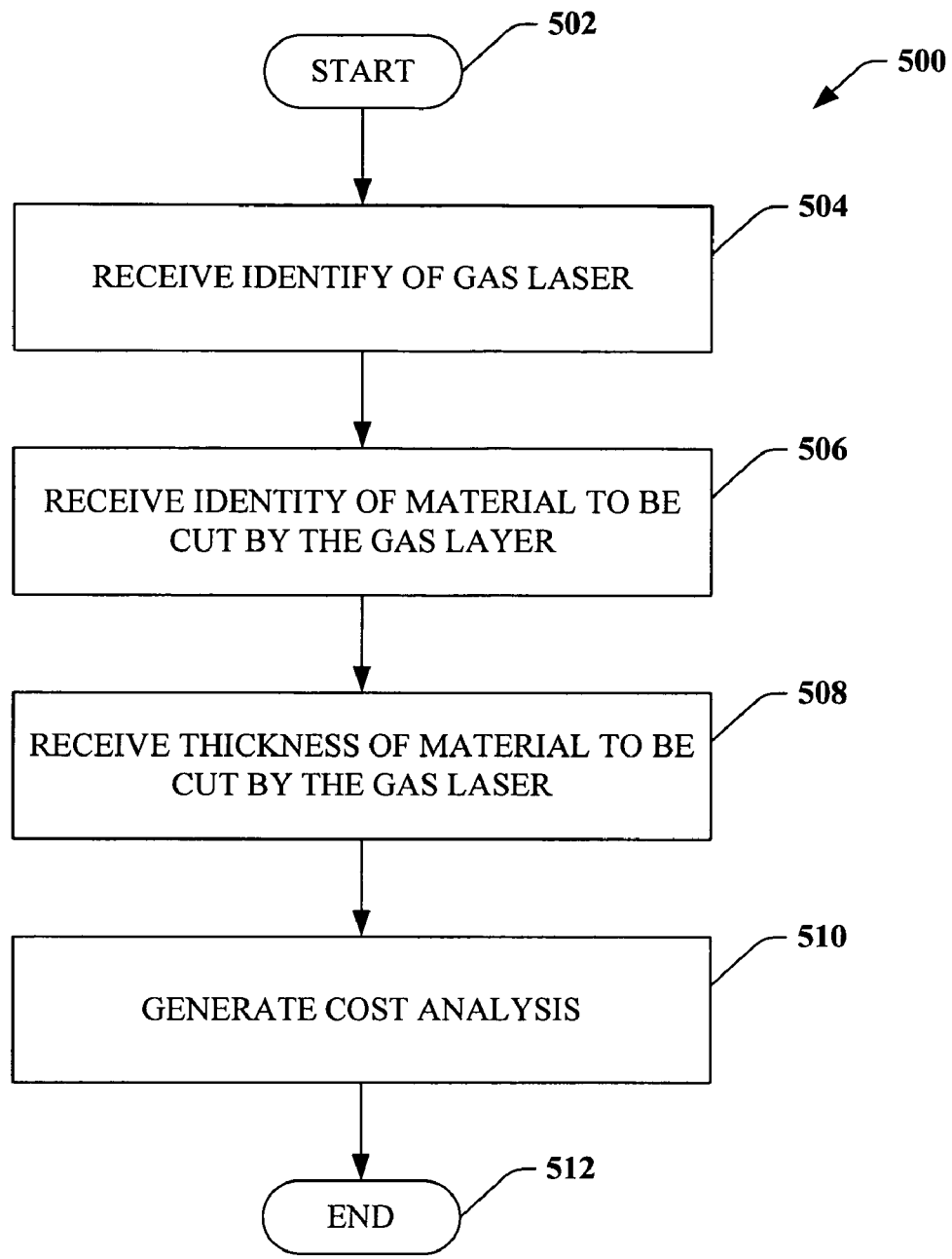
FIG. 5 is a representative flow diagram of a methodology for generating a cost analysis with respect to a gas laser application.
Figure 6:
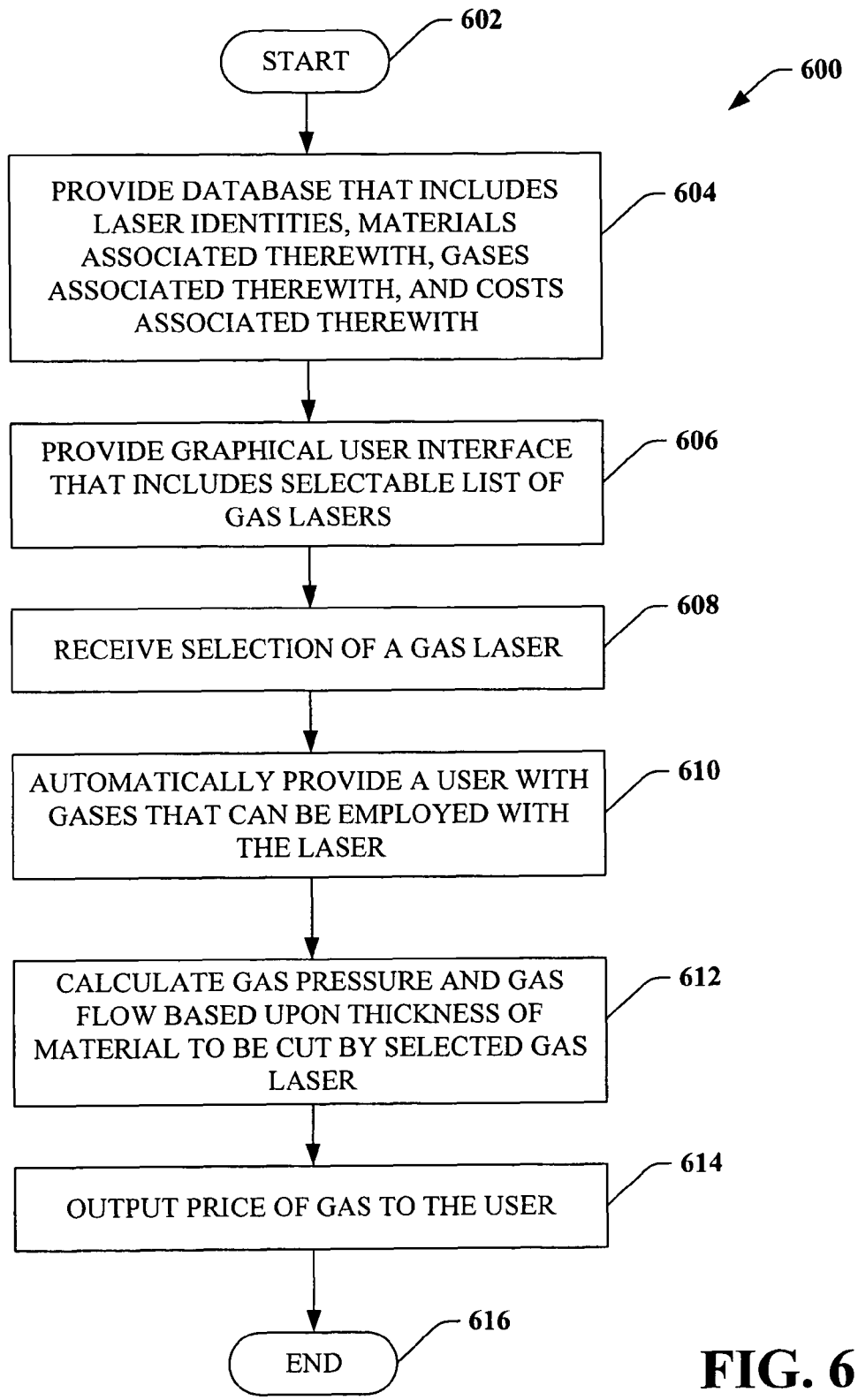
FIG. 6 is a representative flow diagram of a methodology for outputting price of one or more gases to a user.
Figure 7:
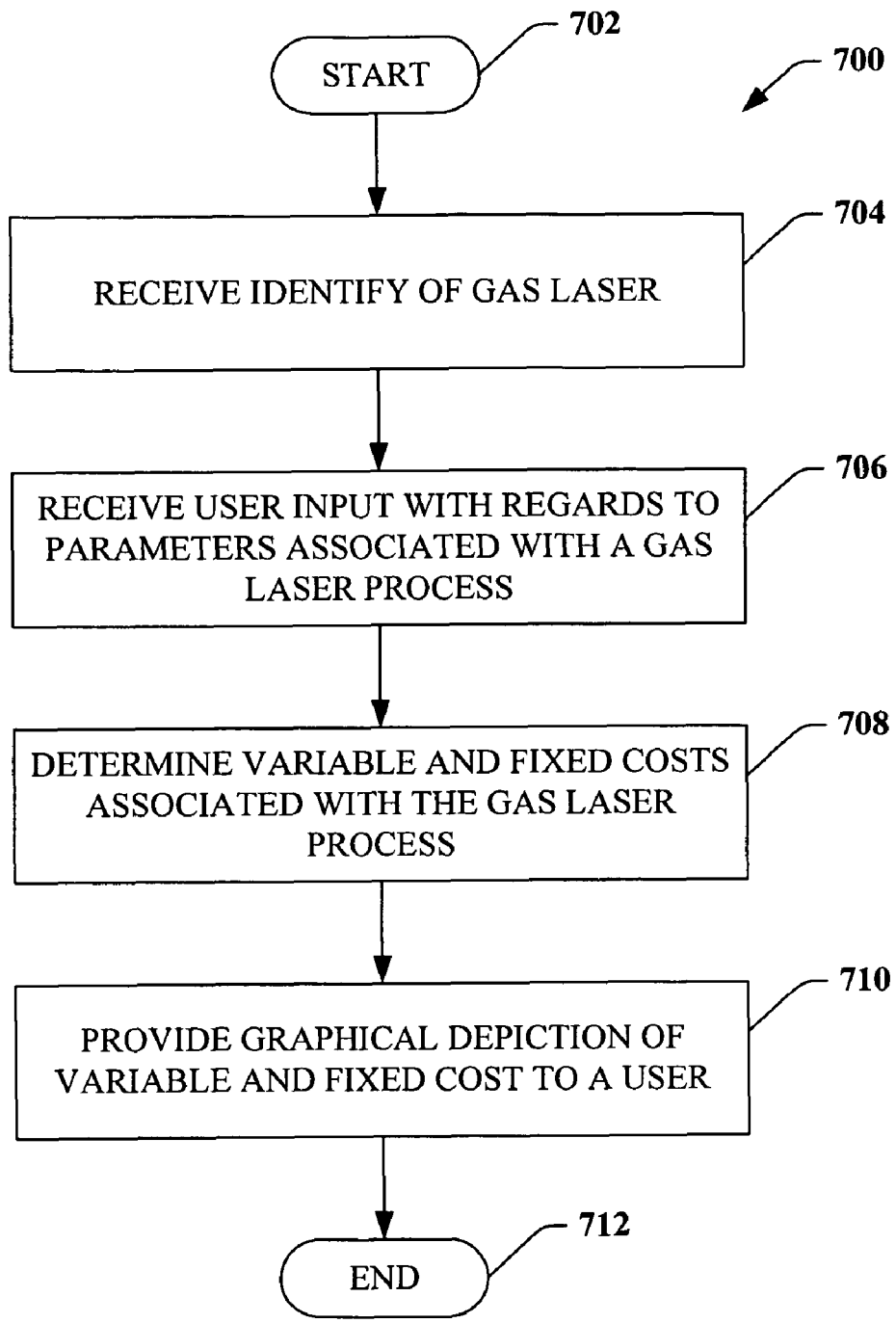
FIG. 7 is a representative flow diagram of a methodology for graphically depicting variable and fixed cost of a gas laser application to a user.

Referring now to FIGS. 5-7, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Now referring specifically to FIG. 5, a methodology 500 for performing a cost analysis with respect to a gas laser application is illustrated. The methodology 500 starts at 502, and at 504 an identity of a gas laser is received. For example, a user can traverse through a list of available gas lasers and identify one of such lasers that is desirably employed within the gas laser application. The user can then select such gas laser (which may be a carbon dioxide laser) through use of a mouse, a pressure-sensitive screen, voice commands, etc. At 506, an identity of material to be cut and/or welded by the gas laser is received. For instance, upon selection of a gas laser, materials that are typically cut with such gas laser can be automatically provided to the user by way of a graphical user interface. Thus, a database can include a plurality of gas lasers and associated materials. Accordingly, the database can include associations or references between gas lasers and materials, thereby enabling provision of materials associated with a gas laser upon identifying the gas laser. The user can then select one or more of the provided materials.

At 508, a thickness associated with the material to be cut by the gas laser is received. For instance, a user interface can be provided with editable fields that are associated with one or more materials. A user can then enter a desired thickness within such editable fields. In accordance with one aspect, the identity of the material can be received when a user enters a thickness associated with such material. At 510, a cost analysis associated with the gas laser application can be automatically generated based at least in part upon the received identity of the gas laser, the received identity of material to be cut by the gas laser, and the received thickness of the material. For instance, based at least in part upon this information, an approximate amount of gas needed to effectuate the gas application over a defined period of time can be determined, and prices can be located with respect to the gases. Furthermore, price of equipment can be estimated based at least in part upon the identified gas laser, the materials, and the thickness of such materials. For example, given a particular gas laser, it can be determined that certain gas cylinders may be required to operate the gas laser. Rental and/or purchase cost of such equipment can be located in a database and provided to a user to enable the user to analyze a prospective gas laser application or and/or an existing gas laser application. The methodology 500 completes at 512.

Now referring to FIG. 6, a methodology 600 for determining price of gas utilized in a laser gas application is illustrated. The methodology 600 starts at 602, and at 604 a database is provided that includes a plurality of lasers, materials associated with the lasers, gases associated with the materials and/or the lasers, and costs associated with the gases, materials, and/or the lasers. Moreover, the database can include prices for various regions, as price of gas and/or equipment in a first geographic region may vary drastically from price of gas and/or equipment in a second geographic region. At 606, a graphical user interface is provided that includes a selectable list of gas lasers. For instance, the graphical user interface can include a pull-down menu, wherein upon a user selecting the pull-down menu at least a subset of the gas lasers in the database are provided. A slide-bar can then be employed, if applicable, to traverse through gas lasers within the database. At 608, a selection of a gas laser from within the list of gas lasers is received. The selection can be made through use of a pointing and clicking mechanism, a stylus and a pressure sensitive screen, voice commands, or any other suitable manner for selecting the gas laser.

At 610, the user is automatically provided with gases that can be employed in connection with the selected laser. For example, some lasers may utilize nitrogen and carbon dioxide while other lasers may use argon and carbon dioxide. Still further, different equipment may be associated with different gases. At 612, gas pressure and gas flow associated with a gas laser application is calculated based at least in part upon thickness of material to be cut and/or welded by the selected gas laser. For instance, given a particular gas laser and a thickness of material to be cut by such laser, an amount of pressure and flow associated with the gas can be automatically determined. At 614, a price of gas over a particular period of time can be ascertained. For instance, as described above, the database can include price for various gases. Given gas pressure and flow required for particular gases, a price of such gases over any suitable period of time can be determined. The methodology 600 completes at 616.

Now referring to FIG. 7, a methodology 700 for graphically illustrating cost of a gas laser application is illustrated. The methodology 700 starts at 702, and at 704 an identity of a gas laser is received. At 706, user input regarding parameters associated with a gas laser process are received, wherein such parameters can include materials to be cut, thickness of such materials, mode of supply associated with assist gas, type of equipment to be employed, and the like. At 708, variable and fixed costs associated with the gas laser process are determined. Fixed cost can relate to cost of equipment (amortized over a threshold amount of time, for example), including purchase cost and/or rental cost. Variable cost can be associated with price of gases needed to effectuate the gas laser process. This cost can be determined by estimating an amount of gas flow and/or gas pressure required for a certain process, and then accessing a price list associated with the gas. At 710, these fixed and variable costs are provided to a user in a graphical manner. For example, a pie chart, a bar chart, or any other suitable graphical depiction of fixed cost versus variable cost of the gas laser application can be provided to the user. Further, a user can select a manner that such costs are to be provided (e.g., type of chart). The methodology 700 completes at 712.

Referring collectively to FIGS. 8-13, a plurality of screen shots of graphical user interfaces that can be employed to receive and output information relating to a gas laser process are illustrated. It is to be understood that these screen shots illustrate exemplary graphical user interfaces, and that any suitable manner for receiving and outputting information described herein is contemplated and intended to fall under the scope of the hereto-appended claims.

Figure 8:
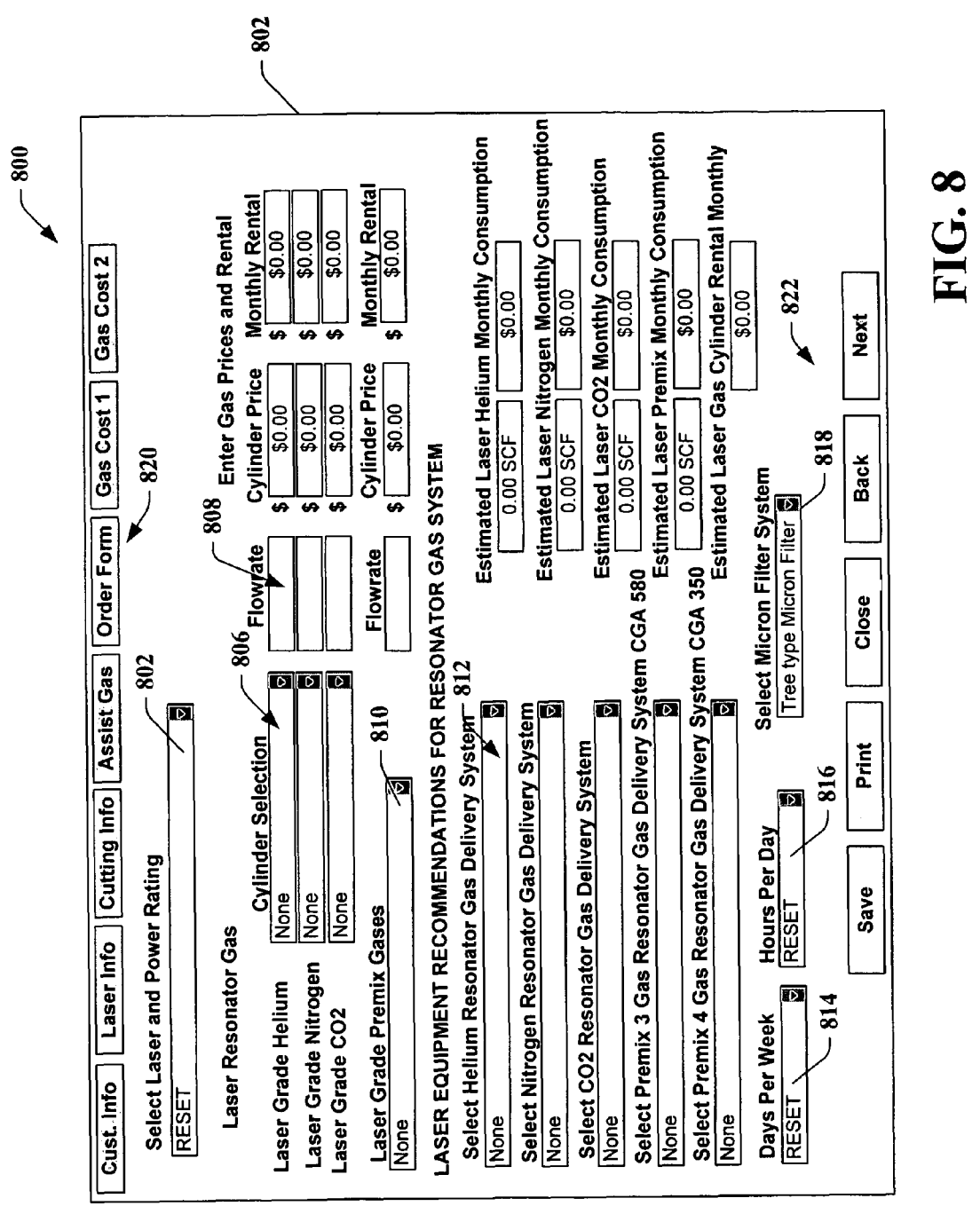

Turning specifically to FIG. 8, a screenshot 800 of a graphical user interface 802 that can be employed in connection with receiving and outputting information relating to a gas laser application is illustrated. The graphical user interface 802 includes a pull-down menu 804 that can be employed to select a gas laser from a plurality of gas lasers. Once the laser is selected, gases that are employed with such laser can be automatically provided, and pull-down menus 806 for selecting types of cylinders associated with the gases can be selected. Upon such selection, flow rate can be automatically calculated. In another example, flow rate of the particular gases can be entered by a user through use of editable fields 808. Upon determining the flow rate, fields that display cost of purchasing the selected gas cylinders and cost of renting the gas cylinders can be provided to the user to aid such user in ascertaining an optimal manner for implementing the gas laser application.

The graphical user interface 802 can further include a pull-down menu 810 for selecting laser grade premix gases, flow rate, purchase price of a gas cylinder, and rental price of such cylinder can be illustrated to the user. In another example, the flow rate can be automatically calculated by an underlying component. Moreover, pull-down menus can be employed that enable the user to select types of gas delivery systems, such as a type of helium resonator gas delivery system, a type of nitrogen resonator gas delivery system, etc. Available gas delivery systems can alter depending upon a type of gas laser selected and/or a type of resonator gas selected. Fields 814 can also be employed to illustrate an estimated amount of gas that may be required as well as an estimated cost associated with such gas. Still further, pull-down menus 814 and 816 can be utilized to enable user-selection of time-frames within which selected gas laser will be employed, such as a number of days per week and/or a number of hours per day. Additionally, a pull-down menu 818 that enables a user to select a type of micron filter system to be employed in connection with the laser application can be existent within the graphical user interface 802. Furthermore, as alluded to above, selection of certain entities within particular pull-down menus can affect entities which are selectable in different pull-down menus.

The graphical user interface 802 can also include a plurality of selectable buttons 820 that enable the user to quickly access disparate interfaces relating to analysis of the gas laser application. For instance, the illustrated graphical user interface can relate to lasers and equipment associated therewith, and selection of a disparate button can cause a user interface associated with material to be cut by the selected gas laser to be provided to the user. The graphical user interface 802 can further include selectable buttons 822 that enable the user to save data input by the user, print such information, close a program, and traverse to disparate graphical user interfaces. For example, the graphical user interface 802 can be perceived to be a portion of a wizard, wherein data is entered in different graphical user interfaces in sequence.

Figure 9:
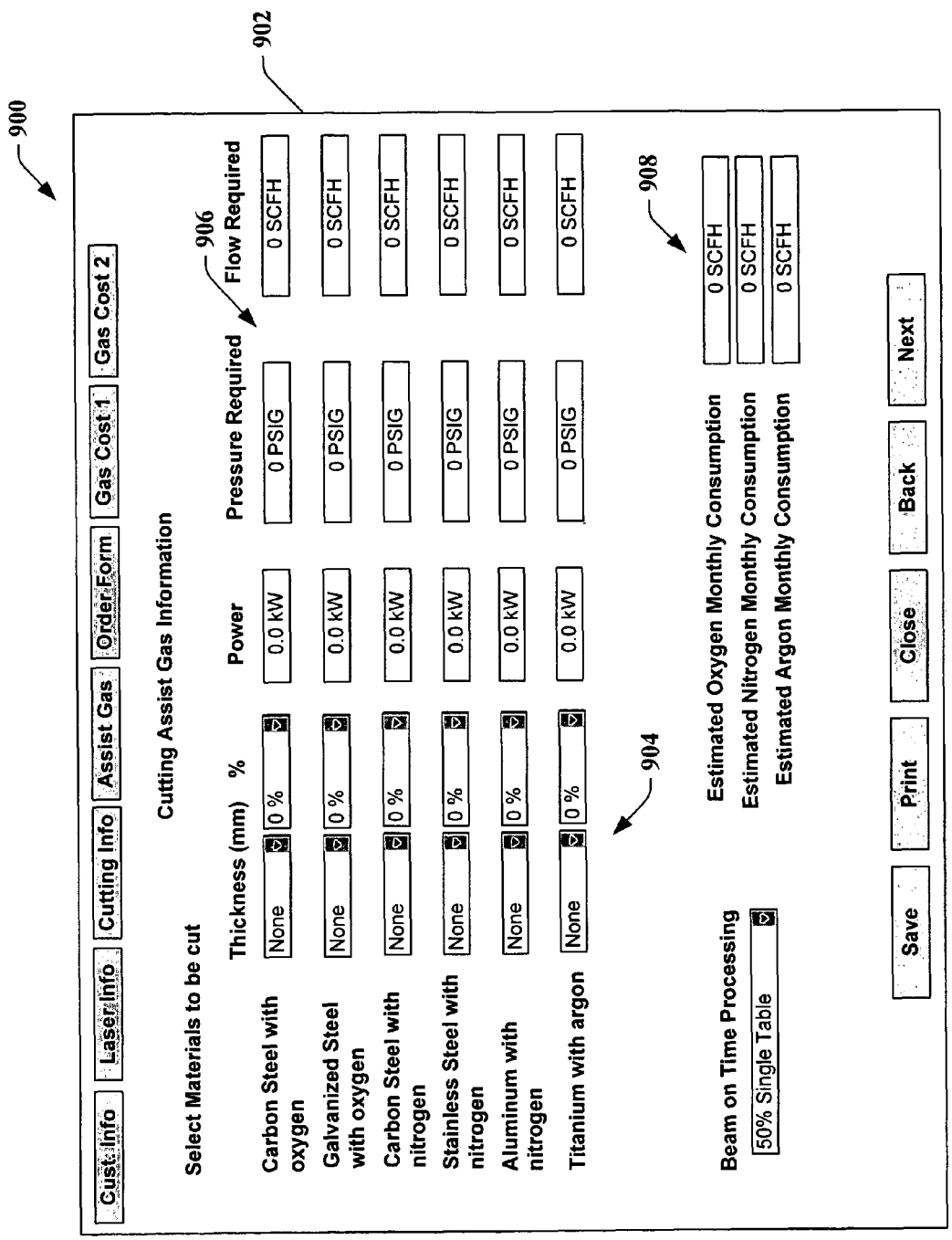
FIG. 9 is a screenshot of an exemplary graphical user interface that can be employed in connection with receiving material type and thickness associated with a gas laser application.

Now turning to FIG. 9, a screenshot 900 of a graphical user interface 902 that can be employed in connection with generating a robust cost analysis of a gas laser application is illustrated. The graphical user interface 902 can relate generally to cutting data associated with the gas laser application. Therefore, the graphical user interface 902 can include a list of materials that can be cut by the laser selected in the graphical user interface 802 (FIG. 8). Various pull-down menus can be provided that enable a user to select a thickness of materials that are to be cut by the selected gas laser. Upon selection of the desired thickness, an estimated power, an estimated gas pressure, and an estimated gas flow that may be needed to effectuate such cutting can be automatically calculated and presented to a user through display fields 906. Display fields 908 can be provided to present a user with an estimated amount of assist gas consumption given the materials to be cut and thickness of such materials. Still further, a pull-down menu 910 can be employed within the graphical user interface 902 to enable a user to select parameters associated with processing relating to "beam on time."

Figure 10:
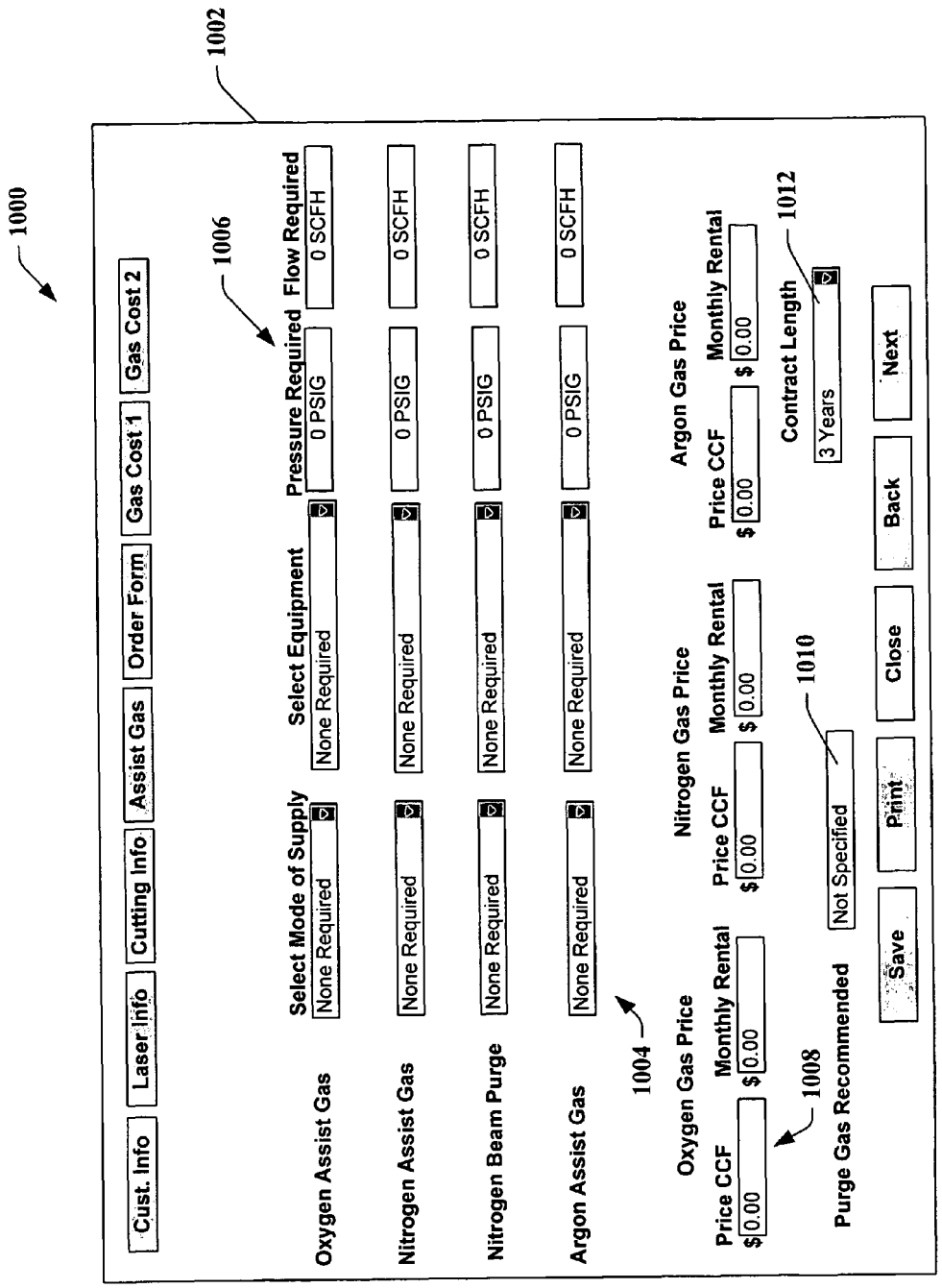
FIG. 10 is a screenshot of an exemplary graphical user interface that can be employed in connection with receiving and displaying information relating to assist gases.

Referring to FIG. 10, a screenshot 1000 of a graphical user interface 1002 that can be employed in connection with generating a robust cost analysis of a gas laser application is illustrated. The graphical user interface 1002 can include a listing of assist gases that can be utilized in connection with the gas application, such as oxygen assist gas, nitrogen assist gas, nitrogen beam purge, and argon assist gas. Pull-down menus 1004 can be utilized within the graphical user interface 1002 to enable user selection of mode of supply and/or equipment associated with particular assist and/or purging gas. Given information provided within the graphical user interfaces 802 and 902 (FIGS. 8 and 9), an amount of pressure and flow associated with the assist gas and needed to effectuate the gas laser application can be calculated and displayed within fields 1006 (for each gas). Given this calculation, display fields 1008 can be employed to present the user with price of each gas as well as monthly rental of equipment associated with each gas. A display field 1010 can also provide the user with a purge gas that is recommended to be utilized with the gas laser application. Moreover, a pull-down menu 1012 can be provided to determine a length of time that a gas laser application will be utilized (e.g., days, months, years). This can be employed to determine rental prices for particular pieces of equipment. Additionally, gas prices at future periods in time can be estimated based upon gas price trends.

Now turning to FIG. 11, a screenshot 1100 of a graphical user interface 1102 that can be utilized as an order form is illustrated. For example, the graphical user interface 1102 can include a table 1104 that comprises equipment needed to effectuate a particular gas laser application, wherein such equipment can be selected equipment as well as equipment that is associated with selected equipment. The table 1104 can include a column that lists a quantity of equipment, a column that includes identifying information (name, item number, etc.) for the equipment, a description of the equipment, a unit price for each piece of equipment, and a total price of equipment. The table 1104 can be perceived as an order form, and can be delivered electronically to a provider of such equipment.

Figure 12:
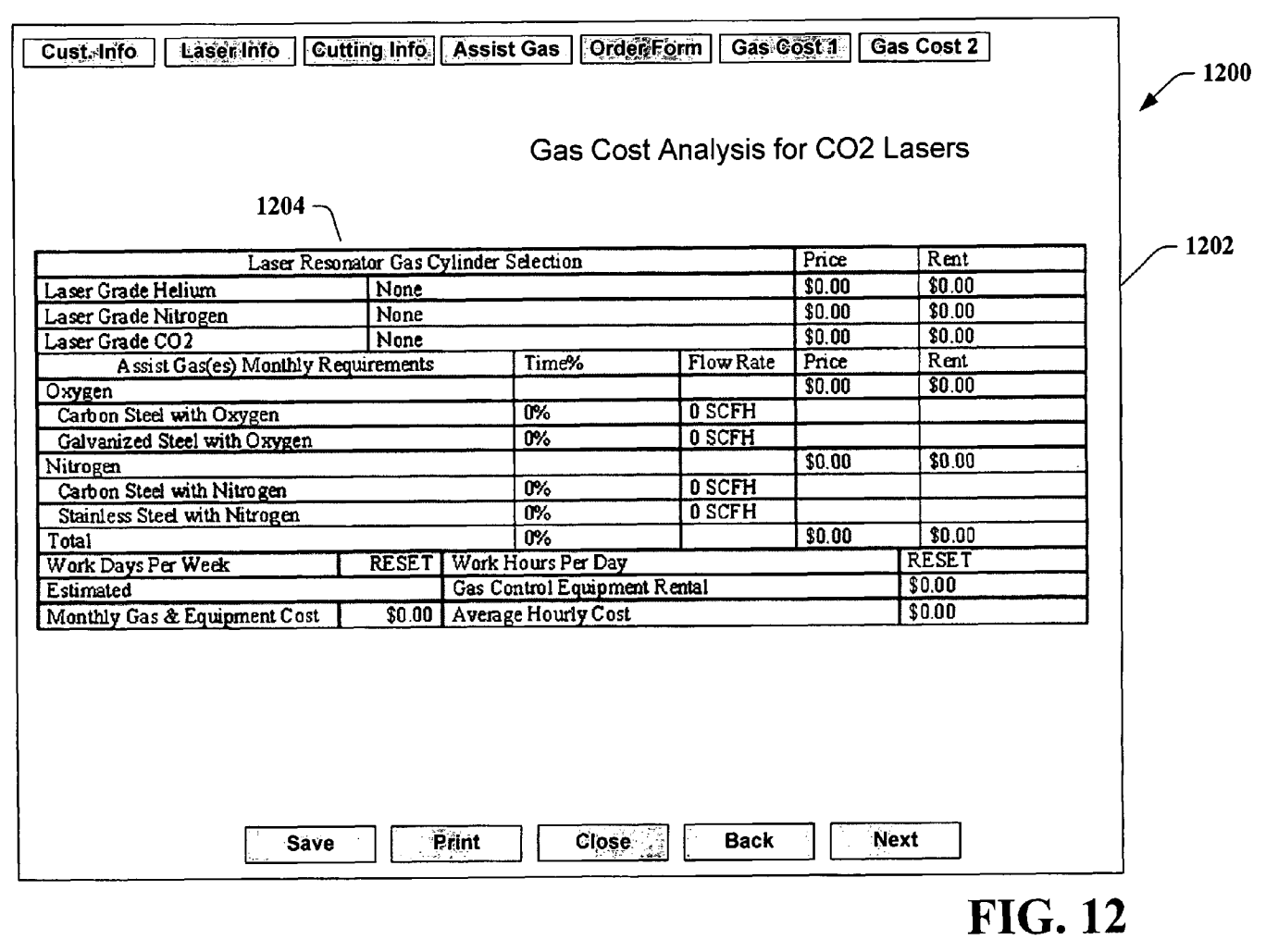

Referring now to FIG. 12, a screenshot 1200 of an exemplary graphical user interface 1202 that can be utilized in connection with analyzing a gas laser application is illustrated. The graphical user interface 1202 includes a table 1204 that comprises information related to gases and particular equipment associated therewith. For instance, the table 1204 can include types of gas and cylinders associated therewith, as well as prices associated with renting and purchasing such cylinders. Moreover, the table 1204 can include information relating to assist gases over a particular period of time. For example, the table 1204 can comprise data relating to flow rate of assist gases, price associated with assist gases, and/or rental price for equipment needed to utilize the assist gases. The table 1204 can also display a number of work hours per week, estimated monthly gas and equipment cost, work hours per day, gas control equipment rental, and average hourly cost associated with the gas laser application.

Now turning to FIG. 13, a screenshot 1300 of a graphical user interface 1302 that can be utilized to present a user with a graphical depiction of a robust cost analysis of a gas laser application is illustrated. The graphical user interface 1302 can include a table 1304 that provides a high-level overview of the gas laser application. For instance, the table can list a gas laser that was selected and pricing associated therewith, resonator gas control system and accessories and pricing associated therewith, and beam purge gas equipment selected and pricing associated therewith. The graphical user interface 1302 can also display a graph 1306 illustrating monthly gas flows, a graph 1308 illustrating assist gas pressures, and a graph 1310 displaying fixed cost versus variable costs (e.g., monthly cutting cost ratios). Fixed costs include costs that will not alter over time, such as purchase price of a piece of equipment (amortized over time). Variable costs can include cost of gases, which may alter over time. Possible alteration can be at least partially accounted for by monitoring past gas prices and estimating price alterations over particular geographic regions. The graphical user interface 1302 can provide a user with a detailed cost analysis of the gas laser application, aiding such user in determining whether to undertake a new application and/or in connection with analyzing a current gas laser application.

Figure 14:
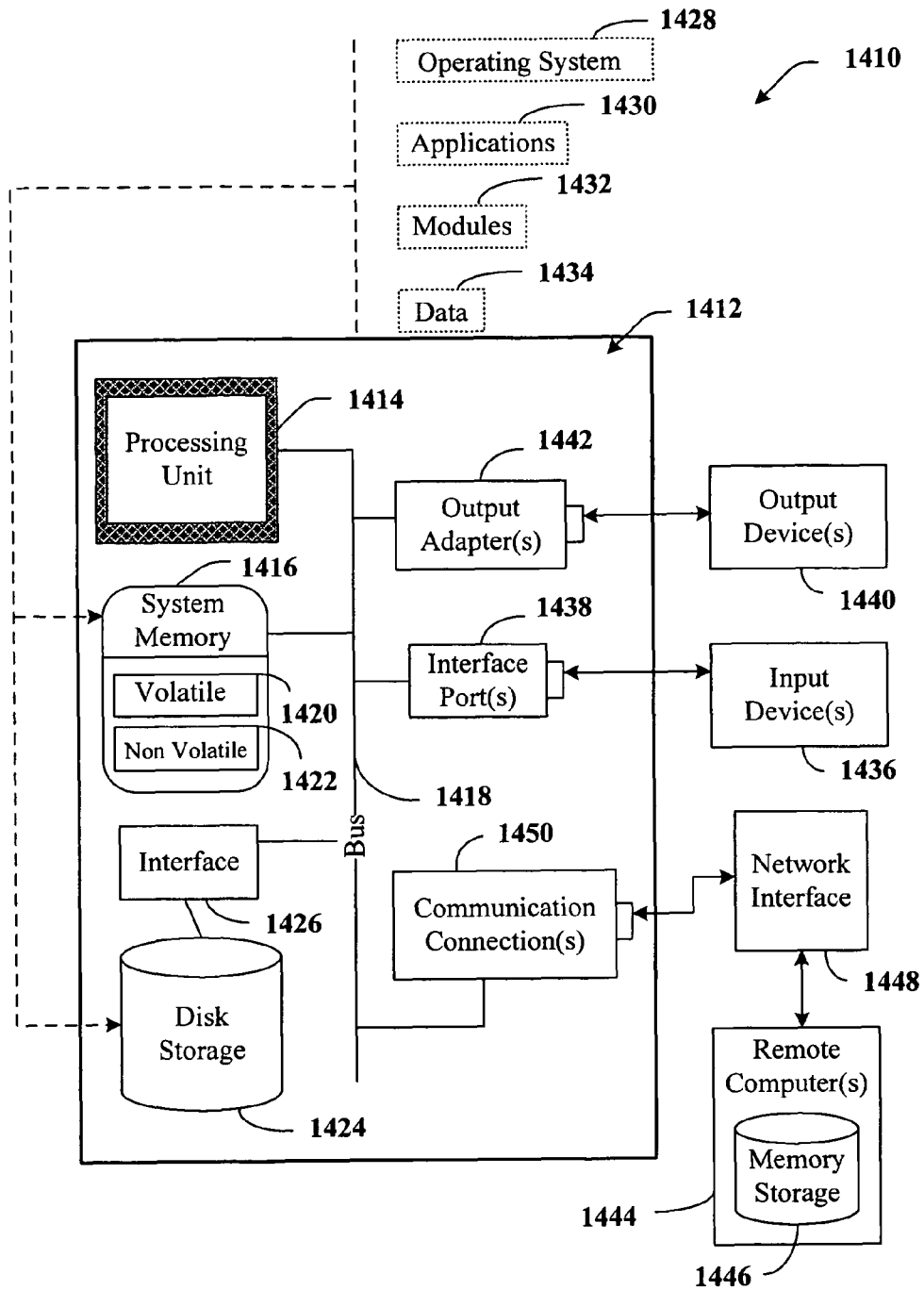
FIG. 14 is an exemplary computing environment that can be utilized in connection with the subject invention.

In order to provide additional context for various aspects of the subject invention, FIG. 14 and the following discussion are intended to provide a brief, general description of a suitable operating environment 1410 in which various aspects of the claimed subject matter may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the features described herein. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 that can be employed in connection with selectively providing advertisements to a user includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, remote control, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
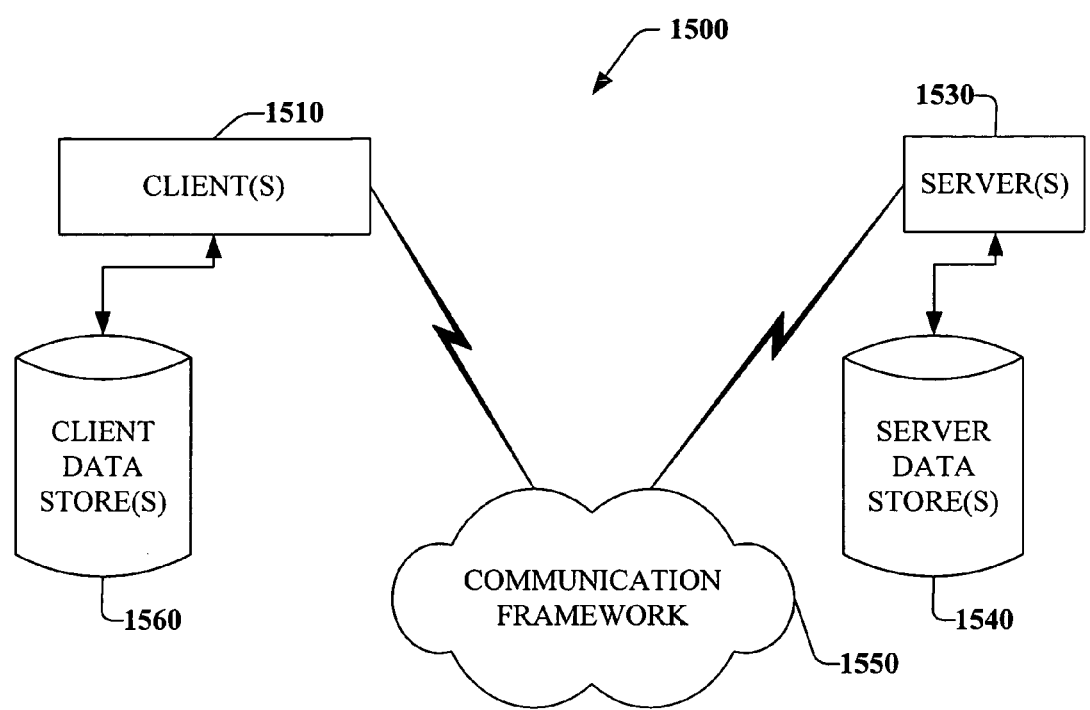
FIG. 15 is an exemplary operating environment that can be employed in connection with the subject invention.

FIG. 15 is a schematic block diagram of a sample-computing environment 1500 with which the claimed subject matter can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the claimed subject matter, for example. One possible communication between a client 1510 and a server 1530 can be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s)

1530 are operably connected to one or more server data store(s) 1540 that can be employed to store information local to the servers 1530. In one particular example, the server(s) 1530 can include information relating to gas lasers, such as identities of various gas lasers, prices associated with gas lasers, and the like. Additionally or alternatively, information relating to gas lasers can also be retained on the client(s) 1510.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    a processor;
    a memory communicatively coupled to the processor, the memory having stored therein computer-executable instructions configured to implement the system, including:
    a database including identities of a plurality of gas lasers and parameters associated with the plurality of gas lasers;
    a receiver component that receives an input, comprising an identity of at least one of the plurality of gas lasers, and receives parameters associated with the at least one of the plurality of gas lasers relating to the gas laser application from the database based at least in part on the input;
    a calculator component that determines a gas pressure and a gas flow associated with the gas laser application based at least in part upon a thickness of material associated with the gas laser application, and estimates a consumption of a gas associated with the gas laser application over a period of time based at least in part on the gas pressure and the gas flow, wherein the period of time is at least one of a day, a week, a month, a quarter or a year; and
    an analysis component that approximates a cost associated with the at least one of the plurality of gas lasers over the period of time based at least in part upon the input, the parameters, the consumption, and a price list including equipment costs, gas costs, and labor costs per unit time with respect to one or more geographic regions the cost analysis includes fixed cost and variable cost of the gas laser application.

2. The system of claim 1, further comprising an interface component that provides selectable parameters associated with the at least one of the plurality of gas lasers.

3. The system of claim 2, wherein the interface component provides at least one dissimilar parameter given a selection of at least a different one of the plurality of gas lasers.

4. The system of claim 2, wherein the interface component comprises a materials component that generates a list of materials and receives an input relating to at least one material cut by the at least one of the plurality of gas lasers within the list of materials.

5. The system of claim 2, wherein the interface component comprises a gas component that generates a selectable list of supply modes associated with the gases associated with the gas laser application and equipment associated with a mode of supply.

6. The system of claim 2, wherein the interface component displays a summary of the cost associated with the at least one of the plurality of lasers.

7. The system of claim 2, wherein the interface component comprises a graphics engine that creates a graphical depiction of the cost associated with the at least one of the plurality of lasers.

8. The system of claim 1, further comprising a save component that facilitates storage of the cost associated with the at least one of the plurality of lasers.

9. The system of claim 1, wherein the database comprises index keys that represent the identities of the plurality of lasers, wherein the index keys are associated with the parameters.

10. A method, comprising:
    employing a processor executing computer executable instructions stored on a computer readable storage medium to implement the acts, comprising:
    receiving an identity of a gas laser employed in a gas laser process;
    accessing a database and retrieving parameters associated with the gas laser from the database, wherein the parameters comprise an equipment cost for the gas laser based at least in part on a geographic area and a gas cost for the gas laser based at least in part on the geographic area;
    determining a gas pressure and a gas flow associated with the as laser process based at least in part upon a thickness of material associated with the gas laser process;
    estimating a consumption of a gas associated with the gas laser process over a period of time based at least in part on the gas pressure and the gas flow, wherein the period of time is at least one of a day, a week, a month, a quarter or a year; and
    generating a cost analysis for the gas laser process based at least in part upon the identity of the gas laser, the parameters associated with the gas laser, the gas pressure, the gas flow, and the consumption of the gas.

11. The method of claim 10, further comprising generating an order form based at least in part upon the cost analysis.

12. The method of claim 10, further comprising graphically presenting the cost analysis to a user.

13. The method of claim 12, wherein the graphically presenting comprises displaying a graph representing the cost analysis.

14. The method of claim 10, further comprising:
    altering the thickness of the material; and
    regenerating the cost analysis.

15. The method of claim 11, further comprising delivering the order form to a vendor electronically.

* * * * *